United States Patent
Hirata et al.

(10) Patent No.: US 8,797,610 B2
(45) Date of Patent: Aug. 5, 2014

(54) PROCESSING APPARATUS CAPABLE OF SWITCHING OPERATION MODE AND COMPUTER READABLE DEVICE

(75) Inventors: Hironori Hirata, Nagoya (JP); Toru Tsuzuki, Okazaki (JP); Shingo Itoh, Komaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 252 days.

(21) Appl. No.: 13/306,817

(22) Filed: Nov. 29, 2011

(65) Prior Publication Data

US 2012/0140295 A1  Jun. 7, 2012

(30) Foreign Application Priority Data

Nov. 30, 2010  (JP) ................. 2010-267391

(51) Int. Cl.
- *H04N 1/04* (2006.01)
- *G06F 3/12* (2006.01)
- *G06K 15/00* (2006.01)
- *H04N 1/21* (2006.01)
- *G03G 15/00* (2006.01)
- *H05B 37/02* (2006.01)
- *G06K 7/10* (2006.01)

(52) U.S. Cl.
USPC ......... 358/475; 358/498; 358/1.13; 358/1.14; 358/1.18; 358/296; 399/49; 315/360; 235/472.01

(58) Field of Classification Search
USPC ............. 358/475, 1.13, 1.14, 1.15, 1.18, 498, 358/296; 399/49; 315/360; 235/472.01
See application file for complete search history.

(56) References Cited

U.S. PATENT DOCUMENTS

| 5,828,462 A | 10/1998 | Hashimoto et al. |
| 2011/0310419 A1* | 12/2011 | Yoshie .................... 358/1.13 |

FOREIGN PATENT DOCUMENTS

| JP | H07-336486 A | 12/1995 |
| JP | H08-124060 A | 5/1996 |
| JP | H08-204890 A | 8/1996 |
| JP | H11-027441 A | 1/1999 |
| JP | 2010-199806 A | 9/2010 |

OTHER PUBLICATIONS

Japan Patent Office, Notification of Reasons for Refusal for Japanese Patent Application No. 2010-267391 (counterpart Japanese patent application), dispatched Feb. 14, 2013.

* cited by examiner

*Primary Examiner* — Charlotte M Baker
*Assistant Examiner* — Rury Grisham
(74) *Attorney, Agent, or Firm* — Baker Botts L.L.P.

(57) ABSTRACT

A processing apparatus includes a photosensor, a processing unit and a control unit. The control unit detects a light receiving signal output from the photosensor during a first light emission period and obtains a first detection result, and makes first determination based on the first detection result by determining whether the processing unit can execute a function. The control unit detects the light receiving signal after a waiting period and obtains a second detection result. The control unit makes second determination based on the second detection result by determining whether the processing unit can execute the function. The control unit makes the second determination in a second mode that requires small consumption power, and according to determination in the second determination in the second mode that the processing unit can execute the function, the control unit keeps the second mode and makes the first determination.

14 Claims, 17 Drawing Sheets

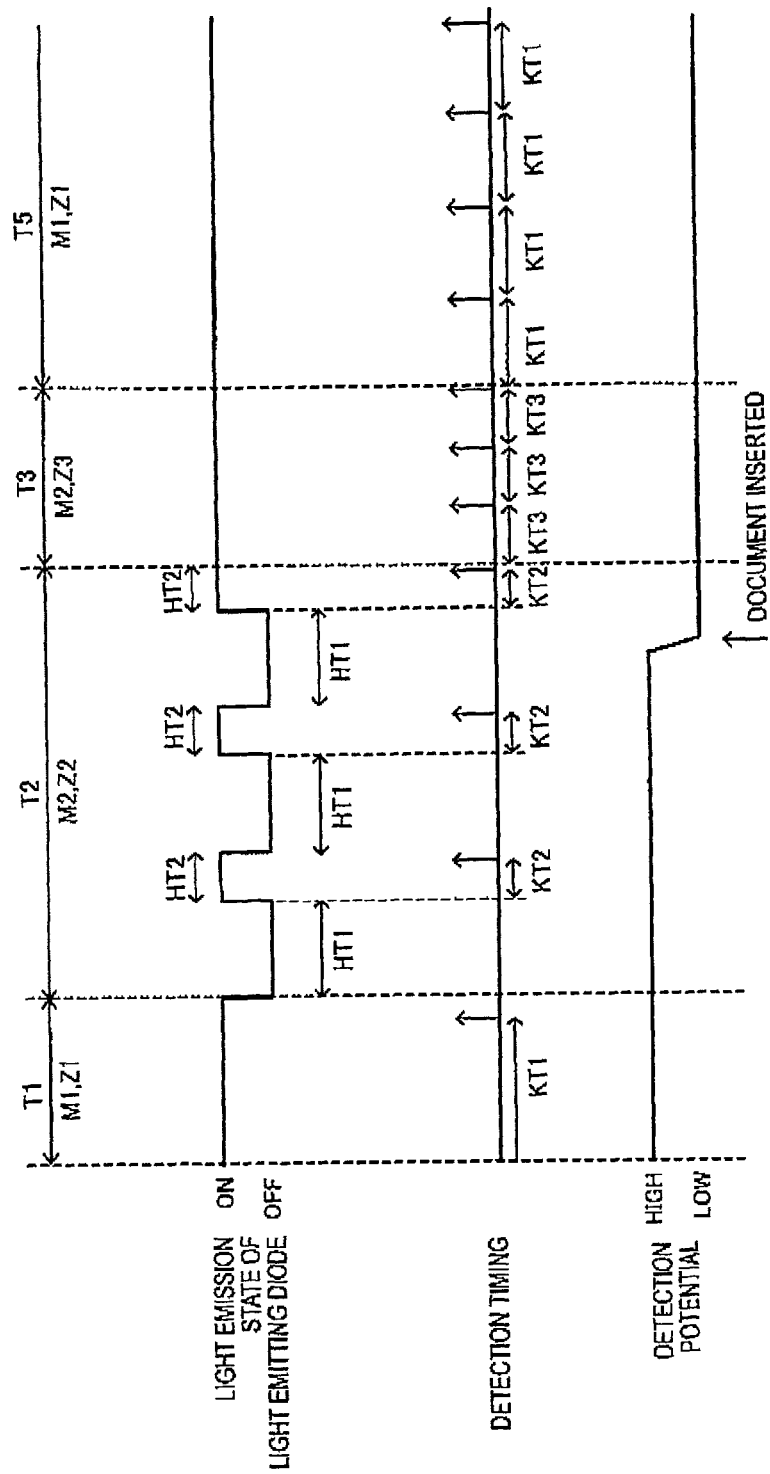

PROCESSING APPARATUS CAPABLE OF SWITCHING OPERATION MODE AND COMPUTER READABLE DEVICE

CROSS REFERENCE TO RELATED APPLICATION

The present application claims priority from Japanese Patent Application No. 2010-267391 filed on Nov. 30, 2010. The entire content of this priority application is incorporated herein by reference.

TECHNICAL FIELD

The present disclosure relates to a technique for determining whether a detection result made by a photosensor is correct or not.

BACKGROUND

An apparatus includes a photosensor for detecting change of the state of the apparatus such as a photosensor detecting that a document is started to be transferred. In such an apparatus, an operation mode is switched between a normal mode and a sleep mode based on a detection result made by the photosensor. A driving section is activated in the normal mode, and power of the driving section is turned off in the sleep mode. Accordingly, consumption power can be reduced in the apparatus. It is known that the photosensor emits light to be lit on continuously in the normal mode and emits light to be lit on intermittently in the sleep mode. This shortens a light emission period of the photosensor in the sleep mode and consumption power can be further reduced.

SUMMARY

In such a photosensor that detects starting of document transfer, an erroneous detection result may be caused due to chattering caused when a document is placed on a paper supply tray or when a document is removed from the paper supply tray or shaking of the apparatus. In an apparatus that switches an operation mode between the normal mode and the sleep mode based on a detection result made by the photosensor, in response to the erroneous detection, the operation mode may be changed from the sleep mode that requires relatively small consumption power to the normal mode that requires relatively great consumption power. This fails to reduce consumption power of the apparatus.

An aspect of the present invention provides a processing apparatus including a photosensor including a light emitting element and a light receiving element, a processing unit configured to execute a predetermined function, and a control unit. The light emitting element emits light and the light receiving element receives light emitted from the light emitting element and outputs a light receiving signal according to an amount of the received light. The control unit is configured to control the light emitting element to emit light for a first light emission period, detect the light receiving signal output from the light receiving element at every interval during the first light emission period and obtain a first detection result according to the detected light receiving signal. The interval is shorter than the first light emission period. The control unit is further configured to make first determination by determining, based on the first detection result, whether the processing unit is in a condition in which the predetermined function is executable, control the light emitting element to emit light for a second light emission period that is shorter than the first light emission period, detect the light receiving signal output from the light receiving element after a waiting period passing from starting of the second light emission period and obtain a second detection result according to the detected light receiving signal. The waiting period is shorter than the second light emission period and shorter than the interval. The control unit is further configured to make second determination by determining, based on the second detection result, whether the processing unit is in a condition in which the predetermined function is executable, and control the processing unit to execute one of a first mode and a second mode that requires smaller consumption power than the first mode, and change an operation mode of the processing unit between the first mode and the second mode. The control unit makes the second determination during execution of the second mode, and according to determination in the second determination in the second mode that the processing unit is in the condition in which the predetermined function is executable, the control unit keeps the second mode and makes the first determination.

BRIEF DESCRIPTION OF THE DRAWINGS

FIG. 17 is a timing chart illustrating detection timing according to another illustrative aspect.

DETAILED DESCRIPTION OF THE ILLUSTRATIVE ASPECTS

<First Illustrative Aspect>

A first illustrative aspect will be hereinafter explained with reference to FIGS. 1 to 11.

1. Mechanical Construction of Multifunctional Apparatus

Figure 1:
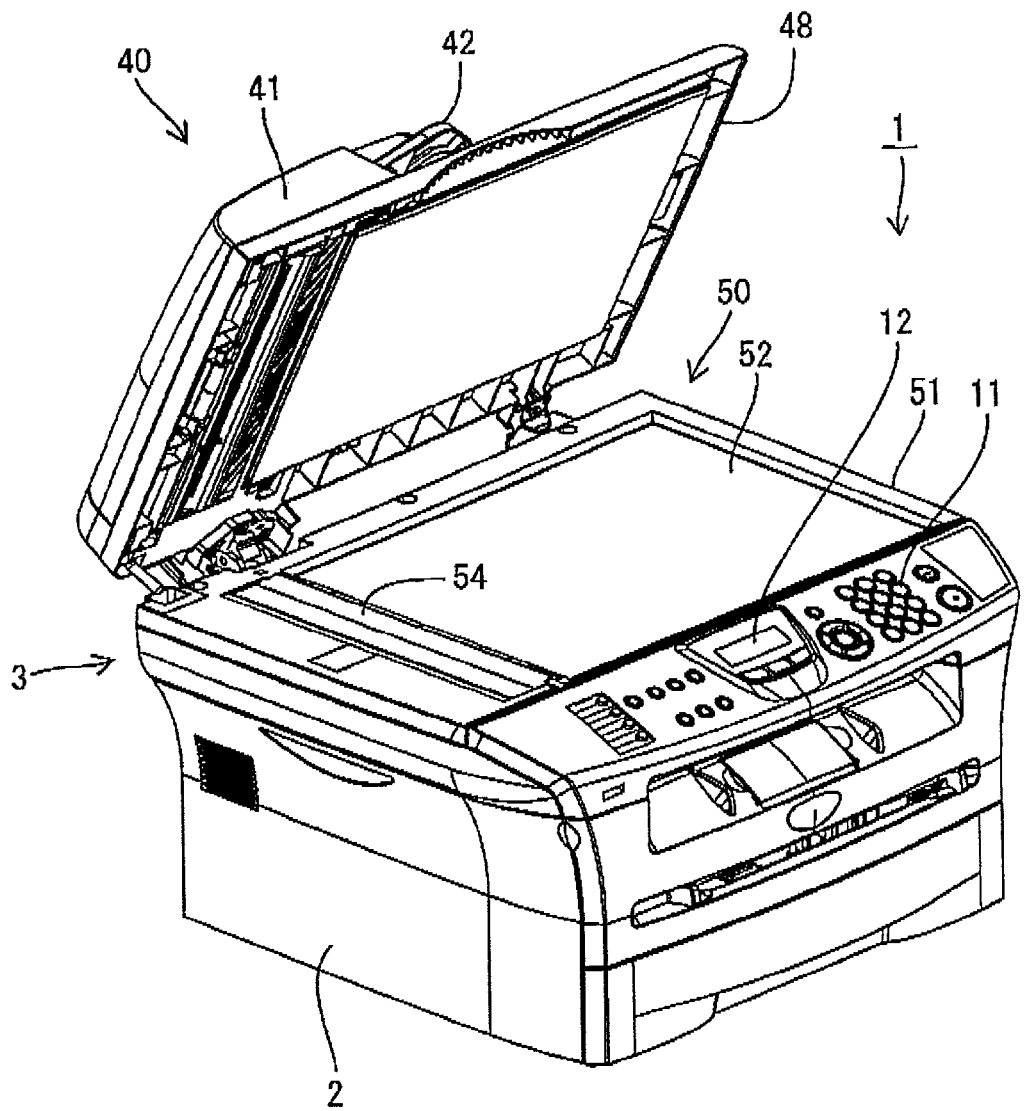
FIG. 1 is a perspective view illustrating a multifunctional apparatus having a document cover being open.

A multifunctional apparatus 1 that is an example of an image forming apparatus includes a document cover 48 and the document cover 48 is open in FIG. 1. The multifunctional apparatus 1 is a multifunctional peripheral device provided with functions of a printer, a scanner, a copier and a facsimile device. The document cover 48 is closed in FIG. 2.

The multifunctional apparatus 1 includes an image reading device 3 for reading a document. The image reading device 3 is provided on an upper side of a main body 2. The image reading device 3 includes a reading section 30, an automatic document feeder (ADF) 40 and a document placing portion 50.

The document placing portion 50 includes a base frame 51, a first platen glass 52 and a second platen glass 53 that are formed of transparent glass pates. The document placing portion 50 is covered with the document cover 48 that can be open and closed.

The document cover 48 rotatably moves between a closed state and an open state. The document cover 48 is closed and covers the document placing portion 50 in the closed state and the document cover 48 is open to expose the document placing portion 50. The document cover 48 is connected and fixed to a rear side of the main body 2 of the multifunctional apparatus 1. The rear side of the main body 2 is opposite side from an operation section 11 and a display section 12. The ADF 40 is provided on the document cover 48.

Figure 2:
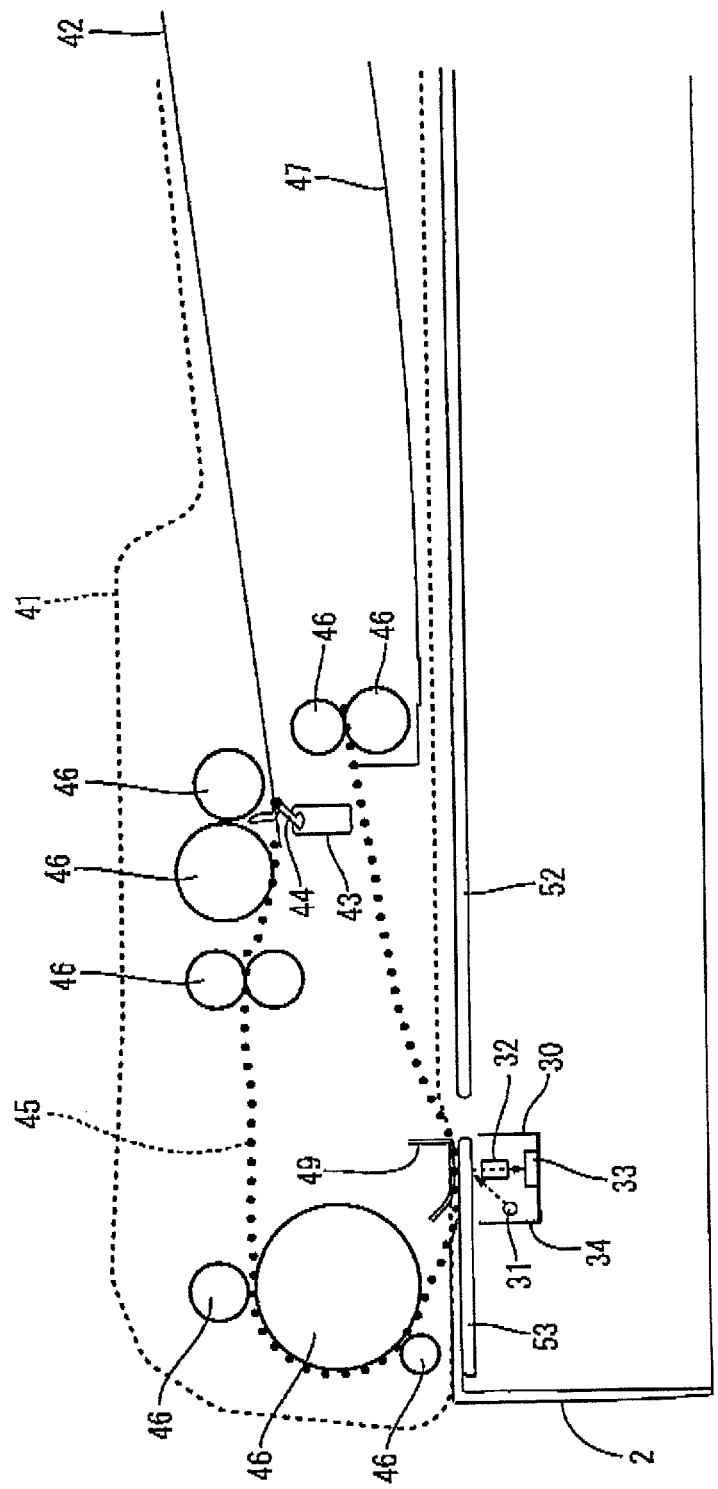
FIG. 2 is a structural view illustrating a general construction of an image reading device.

As illustrated in FIG. 2, the ADF 40 includes an ADF cover 41, a document tray 42, a document sensor 43, a blocking member 44, a transfer path 45, various rollers 46, a step motor, a discharge tray 47, and a pressure member 49.

Figure 3:
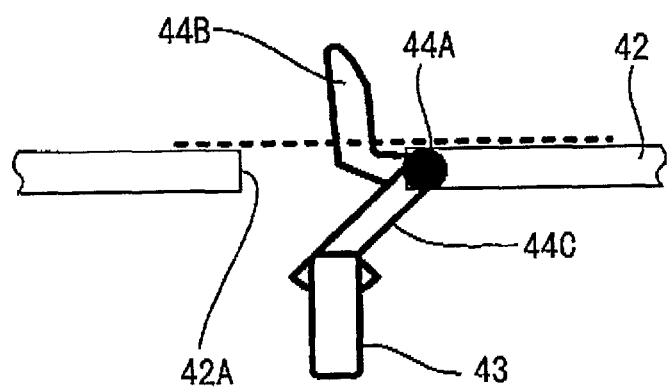
FIG. 3 is a side view illustrating a document sensor.
Figure 4:
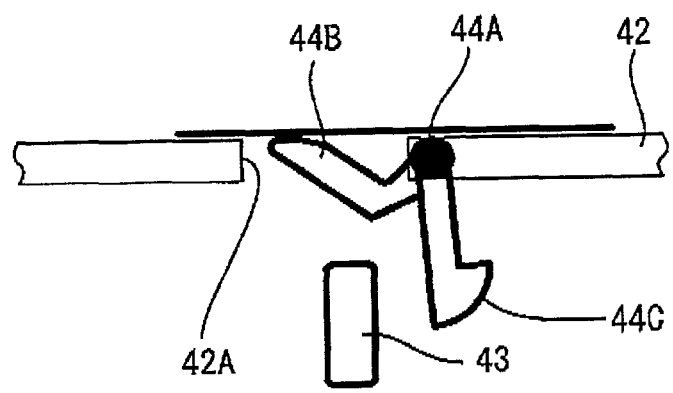
FIG. 4 is a side view illustrating the document sensor.

As illustrated in FIGS. 3 and 4, the document sensor 43 is provided below the document tray 42 and the blocking member 44 is supported to be rotatable around a shaft 44A that is arranged in the document tray 42. If no document is placed on the document tray 42, as illustrated in FIG. 3, an upper end 44B of the blocking member 44 is projected upwardly from the document tray 42 through an opening 42A that is formed in the document tray 42, and a lower end 44C of the blocking member 44 is located in a recess 43C (see FIG. 5) that is formed in the document sensor 43. If a document is placed on the document tray 42, as illustrated in FIG. 4, the blocking member 44 is pushed by the document to be rotated around the shaft 44A and accordingly the lower end 44C moves out of the recess 43A of the document sensor 43.

Figure 5:
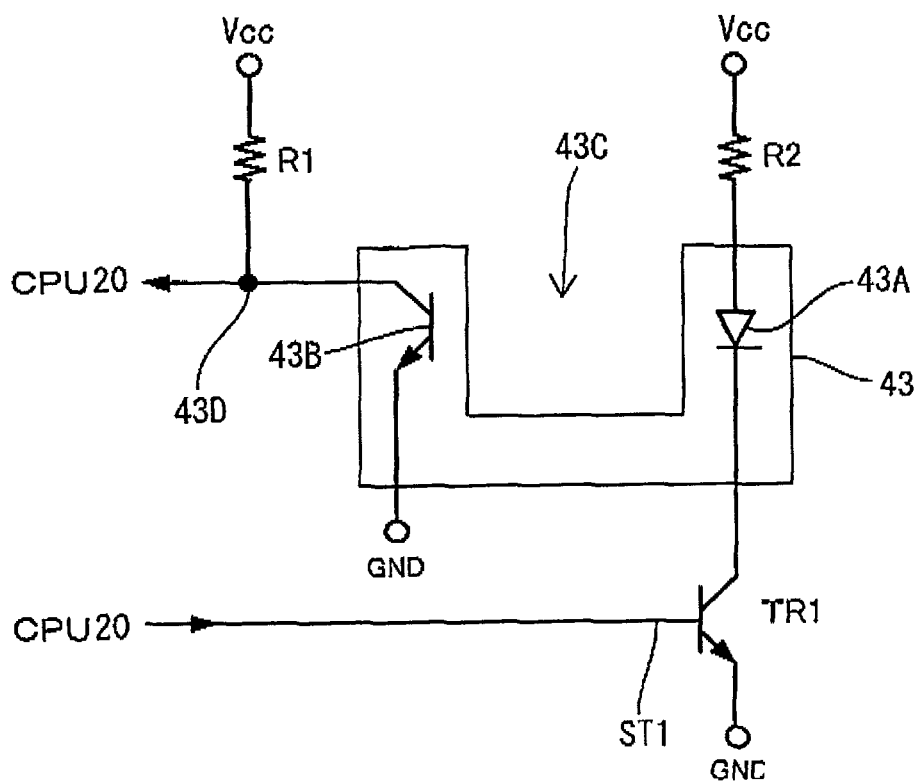
FIG. 5 is a general circuit diagram of the document sensor.

An equivalent circuit of the document sensor 43 will be explained with reference to FIG. 5. The document sensor 43 includes a light emitting diode 43A and a photoexcited transistor 43B. One end of the light emitting diode 43A is connected to a power source Vcc via a resistance R2 and another end of the light emitting diode 43A is connected to a ground GND via a transistor TR1. A switching terminal ST1 of the transistor TR1 is connected to a central processing unit 20 that will be described later. If the transistor TR1 is turned off by a control signal that is applied to the switching terminal ST1 from the central processing unit 20, the light emitting diode 43A stops emitting light. On the other hand, if the transistor TR1 is turned on by a control signal from the central processing unit 20, current is supplied to the ground GND from the power source Vcc via the light emitting diode 43A and the light emitting diode 43A emits light.

The photoexcited transistor 43B is arranged to face the light emitting diode 43A. One end 43D of the photoexcited transistor 43B is connected to a power source Vcc via a resistance R1 and also connected to the central processing unit 20. Another end of the photoexcited transistor 43B is connected to a ground GND. If the light emitting diode 43A does not emit light, the photoexcited transistor 43B is turned off and the potential of the one end 43D of the photoexcited transistor 43B is equal to the power source Vcc potential (hereinafter, referred to as HIGH). Further, if no document is placed on the document tray 42, the blocking member 44 enters the recess 43C provided between the light emitting diode 43A and the photoexcited transistor 43B with the light emitting diode 43A emitting light. Accordingly, the light emitted from the light emitting diode 43A does not enter the photoexcited transistor 43B. In such a case also, the photoexcited transistor 43B is turned off and the potential of the one end 43D of the photoexcited transistor 43B is equal to the power source Vcc potential (HIGH). On the other hand, if a document is placed on the document tray 42, the light emitted from the light emitting diode 43A enters the photoexcited transistor 43B. In such a case, the photoexcited transistor 43B is turned on and the potential of the one end 43D of the photoexcited transistor 43B is equal to the ground GND potential (hereinafter, referred to as LOW).

The central processing unit 20 controls the light emitting diode 43A to emit light and detects the potential of the one end 43D of the photoexcited transistor 43B with the light emitting diode 43A emitting light. Accordingly, the central processing unit 20 detects whether a document is placed on the document tray 42.

If the ADF 40 detects that a document is placed on the document tray 42, the rollers 46 are driven to transfer the document placed on the document tray 42 one by one to the transfer path 45. The document passes by a surface of the second platen glass 53 on the transfer path 45 and is discharged to the discharge tray 47. The pressure member 49 pressures the document toward the second platen glass 53 so that the document passing by the surface of the second platen glass 53 is not lifted up from the second platen glass 53. The ADF 40 further includes a plurality of photosensors for detecting the document forwarding on the transfer path 45.

The reading section 30 is provided under the document placing portion 50. The reading section 30 is configured by a CIS (contact image sensor) and reads the document passing by the surface of the second platen glass 53. The reading section 30 includes a linear image sensor 33, a light source 31, a rod lens array 32, a carriage 34 and a transfer mechanism. The linear image sensor 33 includes a plurality of light receiving elements that are linearly arranged in a vertical direction with respect to a paper surface in FIG. 2. The light source 31 is configured by light emitting diodes emitting light of three colors of RGB. Light emitted from the light source 31 reflects off the document and images are formed by each light receiving element of the linear image sensor 33 via the rod lens array 32 based on the reflected light. The carriage 34 houses the linear image sensor 33, the light source 31 and the rod lens array 32. The transfer mechanism transfers the carriage 34. The linear image sensor 33 detects brightness and chromaticity of the reflected light according to which an image is formed on the light receiving element and generates data based on images of the document. The images of the document includes a content indicated on the document and also a shape of the document itself. The reading section 30 is not limited to the CIS type but may be a CCD type using a CCD (charge-coupled device) image sensor.

An operation section 11 and a display section 12 are provided on a front side of the multifunctional apparatus 1. The operation section 11 includes various buttons and receives operation instructions from a user. The display section 12 is configured by a liquid crystal display for displaying a state of the multifunctional apparatus 1. The multifunctional apparatus 1 includes an image forming section 13 in a lower portion of the main body 2.

2. Electrical Configuration of Multifunctional Apparatus

Figure 6:
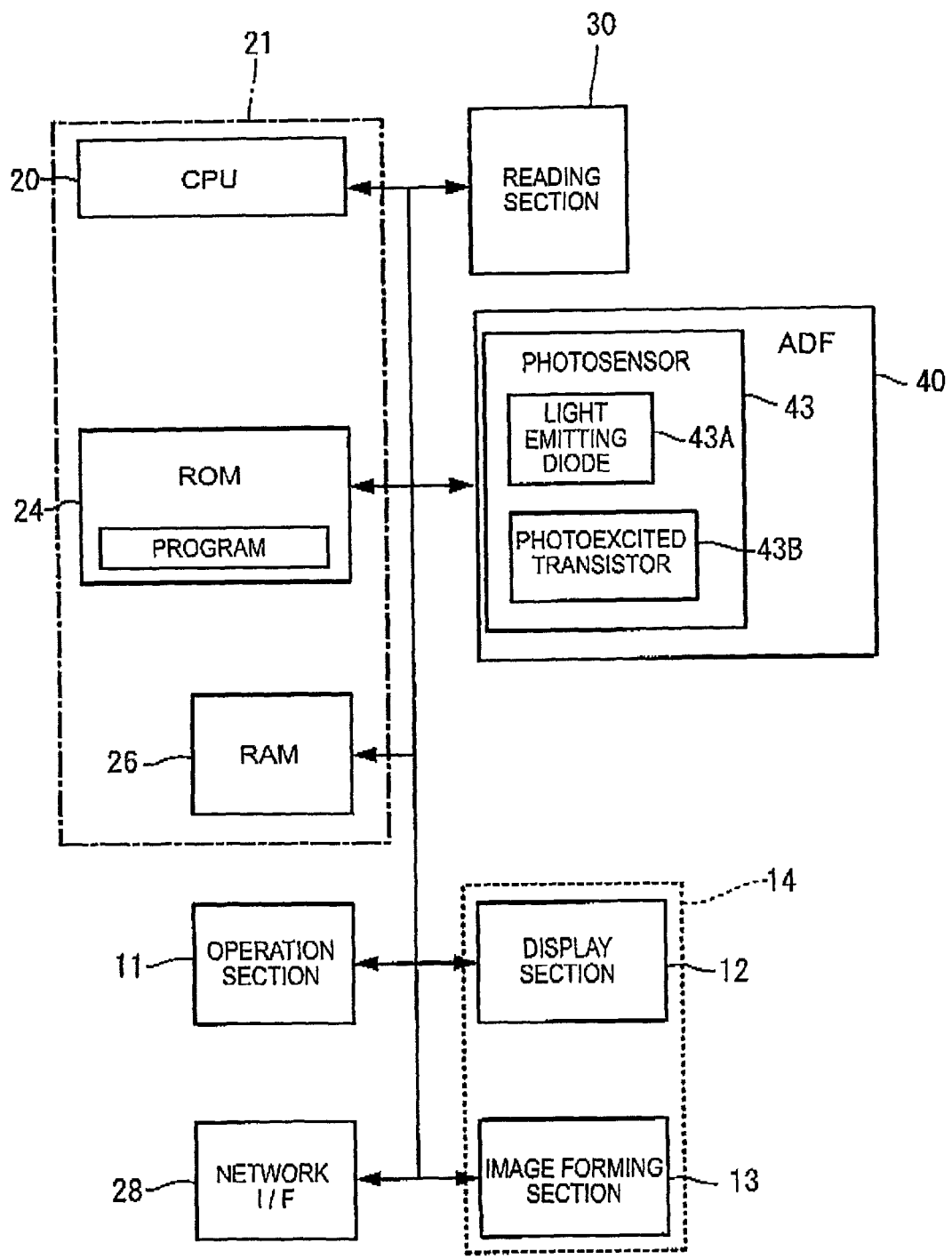
FIG. 6 is a block diagram illustrating general electric configuration of the multifunctional apparatus.

An electrical configuration of the multifunctional apparatus 1 will be explained with reference to FIG. 6. As illustrated in FIG. 6, the multifunctional apparatus 1 includes a control unit 21 and a network interface 28, and the operation section 11, the display section 12, the image forming section 13, the reading section 30 and the ADF 40 are connected thereto. The control unit 21 includes a control processing unit (CPU) 20, a ROM 24 and a RAM 26.

The ROM 24 stores various programs for controlling the operation of the multifunctional apparatus 1. The CPU 20 executes detection control processing, determination processing and mode control processing according to the program read from the ROM 24.

The image forming section 13 forms images that are read by the reading section 30 on a recording medium such as a paper. The network interface 28 is connected to an external computer via a communication line and establishes mutual data communication with the external computer.

3. Control Process

Next, processes executed by the control unit 21 will be explained with reference to FIGS. 7 to 11.

(Processing Operation)

Figure 7:
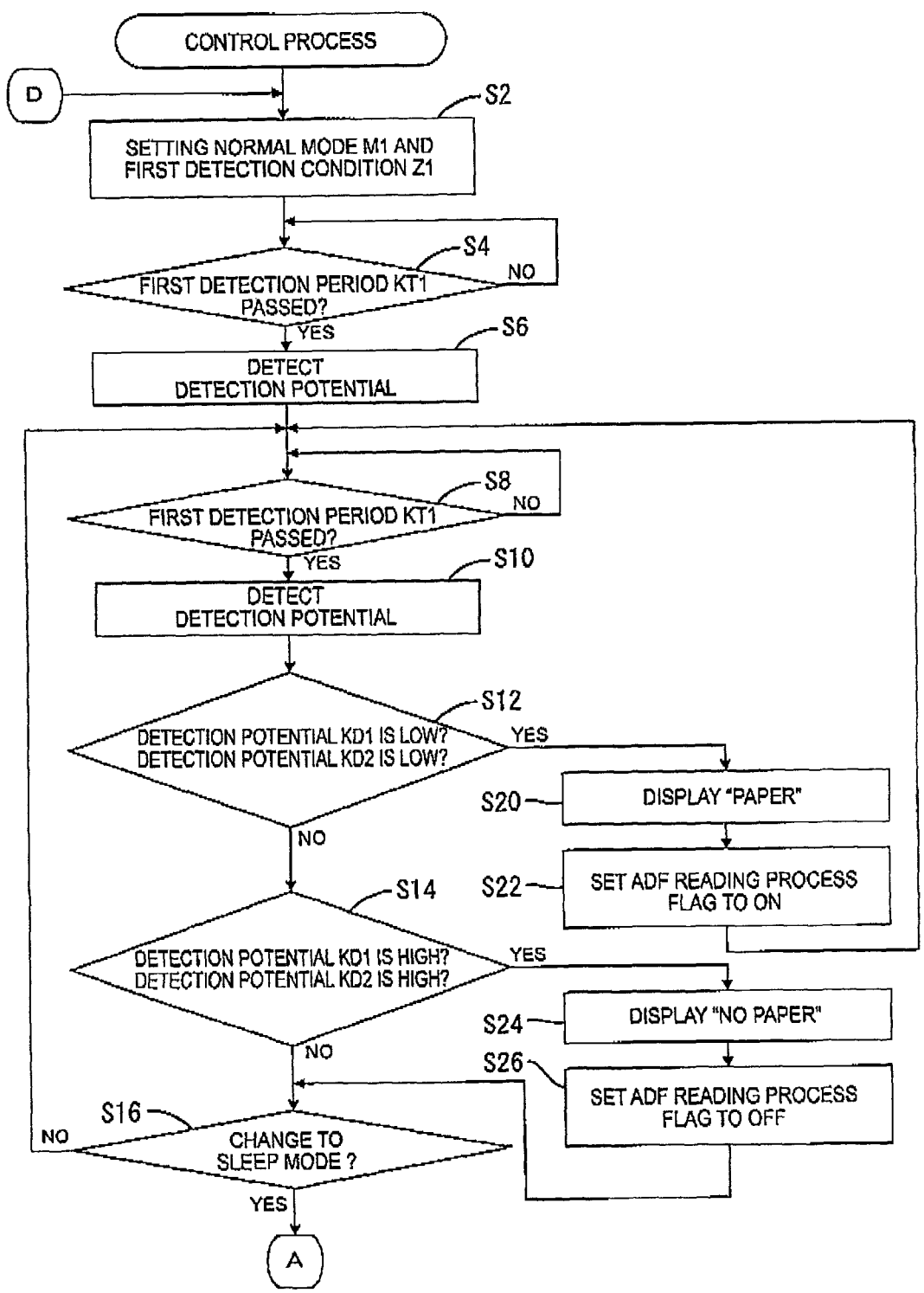
FIG. 7 is a flowchart illustrating a control process according to a first illustrative aspect.
Figure 8:
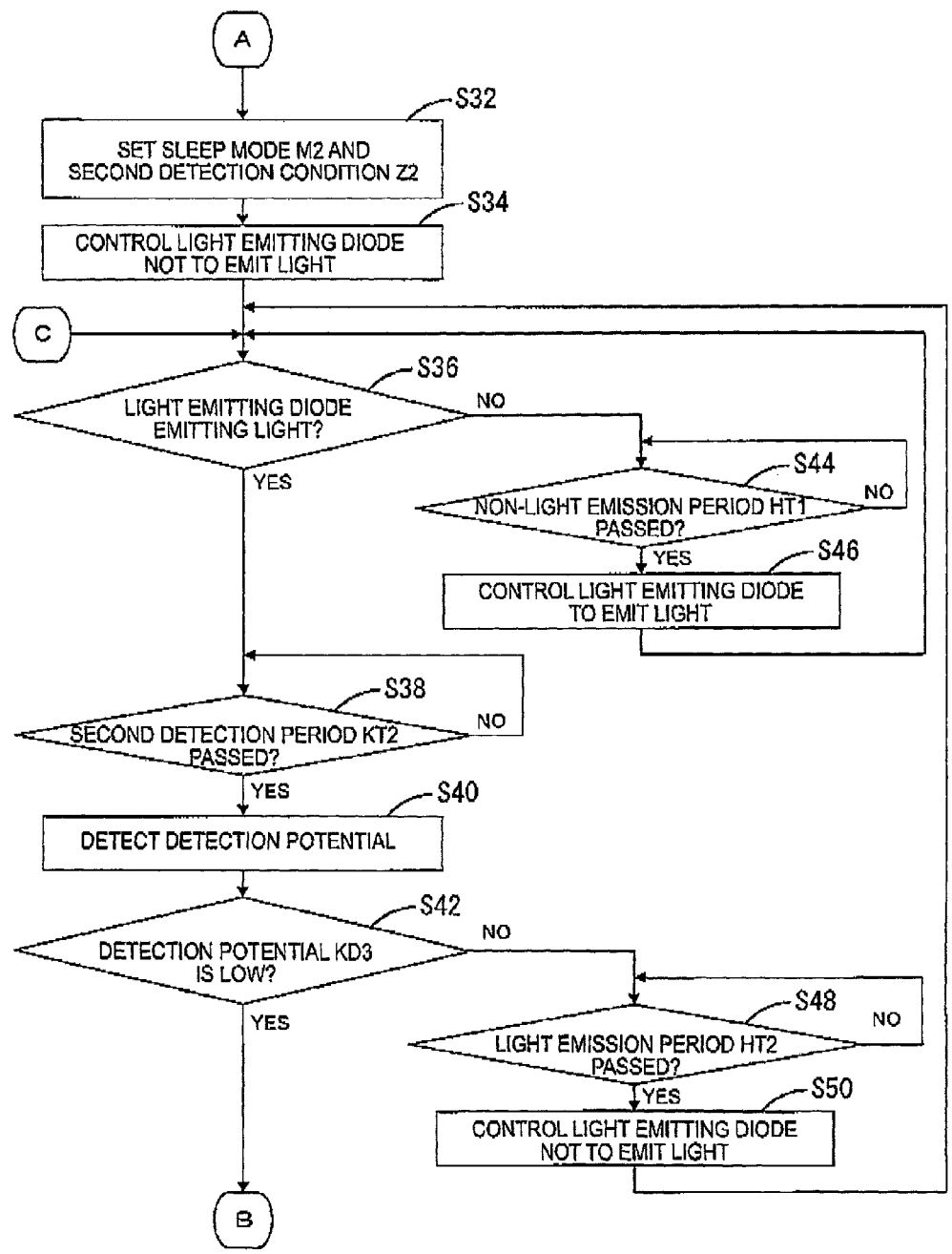
FIG. 8 is a flowchart illustrating a control process according to the first illustrative aspect.
Figure 9:
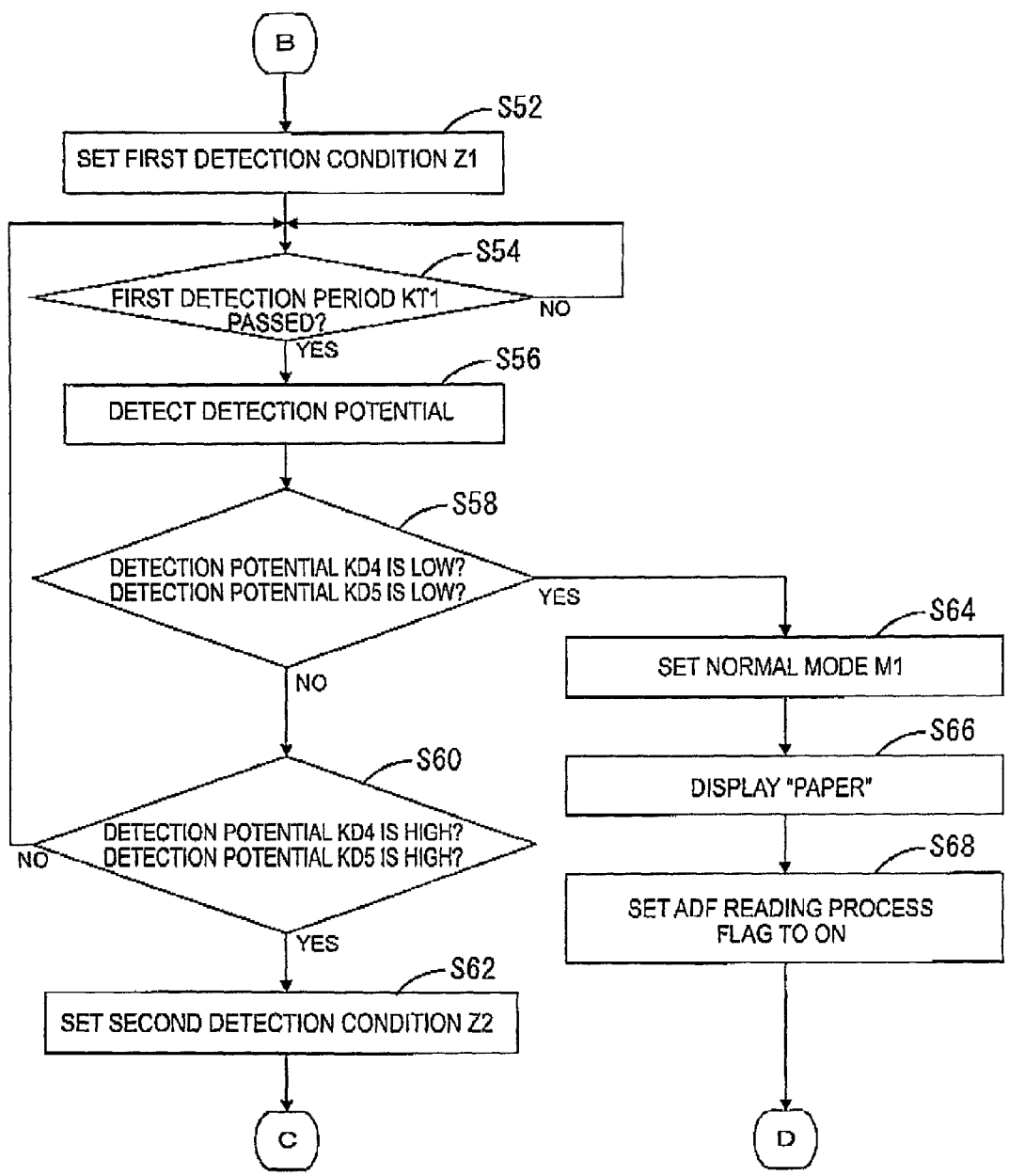
FIG. 9 is a flowchart illustrating a control process according to the first illustrative aspect.

According to the flowcharts in FIGS. 7 to 9, the mode control processing will be explained. In the mode control processing, the operation mode is switched between a normal mode M1 and a sleep mode M2 and the driving section 14 including the display section 12 and the image forming section 13 is controlled based on the potential of the one end 43D of the document sensor 43 that is detected at a predetermined detection timing by the CPU 20 (hereinafter, referred to as a detection potential). In the normal mode M1, all of the functions of the driving section 14 can be executed and the apparatus requires power sufficient for maintaining all the functions in the executable state. On the other hand, in the sleep mode M2, only a part of the functions of the driving section 14 can be executed and the apparatus requires power consumption smaller than the normal mode M1.

Detection timings of the CPU 20 will be explained according to the timing charts in FIGS. 10 and 11. Detection timings when a document is placed on the document tray 42 in the sleep mode M2 (period 12) are indicated in the timing chart of FIG. 10. Detection timings when no document is placed on the document tray 42 and noise is caused due to quaking of the apparatus in the sleep mode M2 (the period T2) are indicated in the timing chart of FIG. 11.

Figure 10:
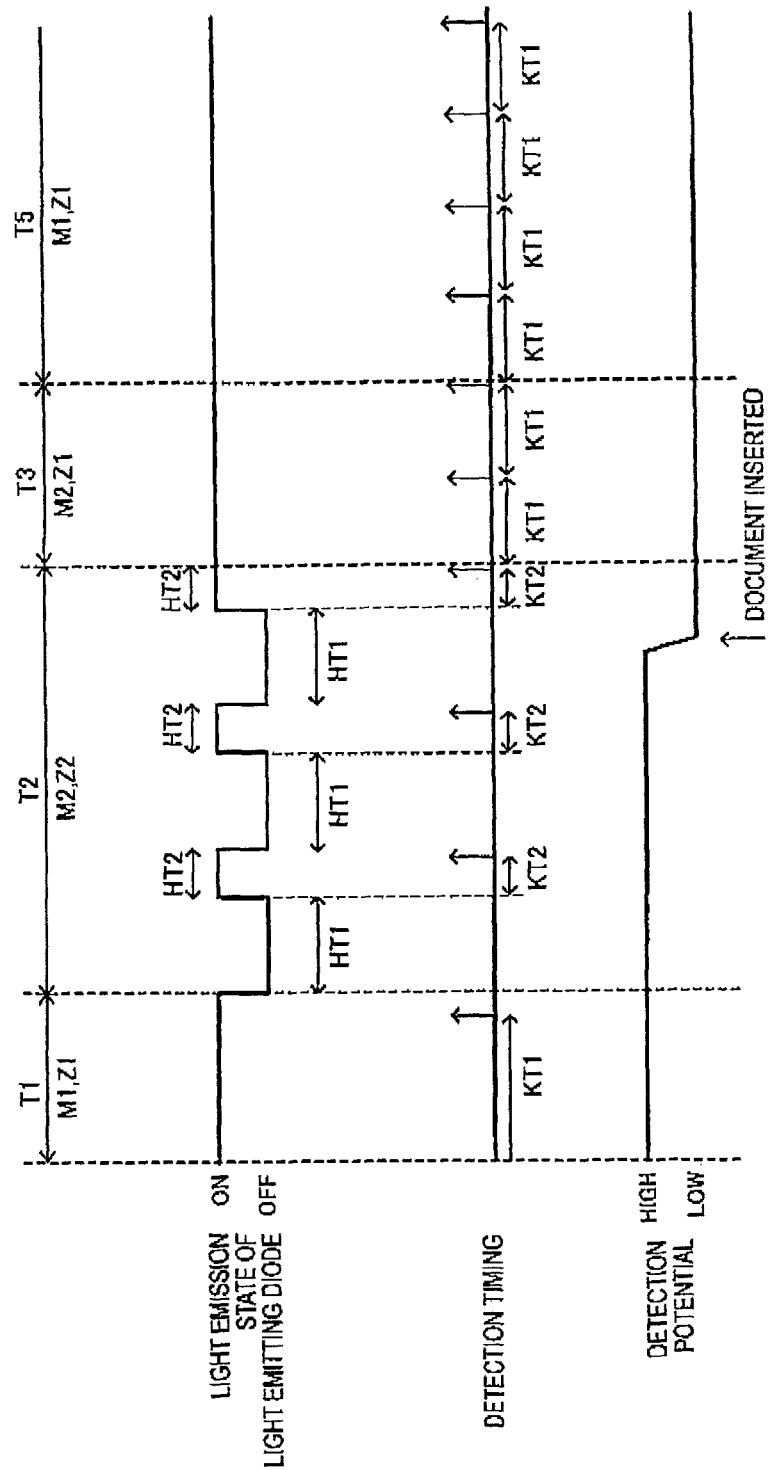
FIG. 10 is a timing chart illustrating detection timing according to the first illustrative aspect.
Figure 11:
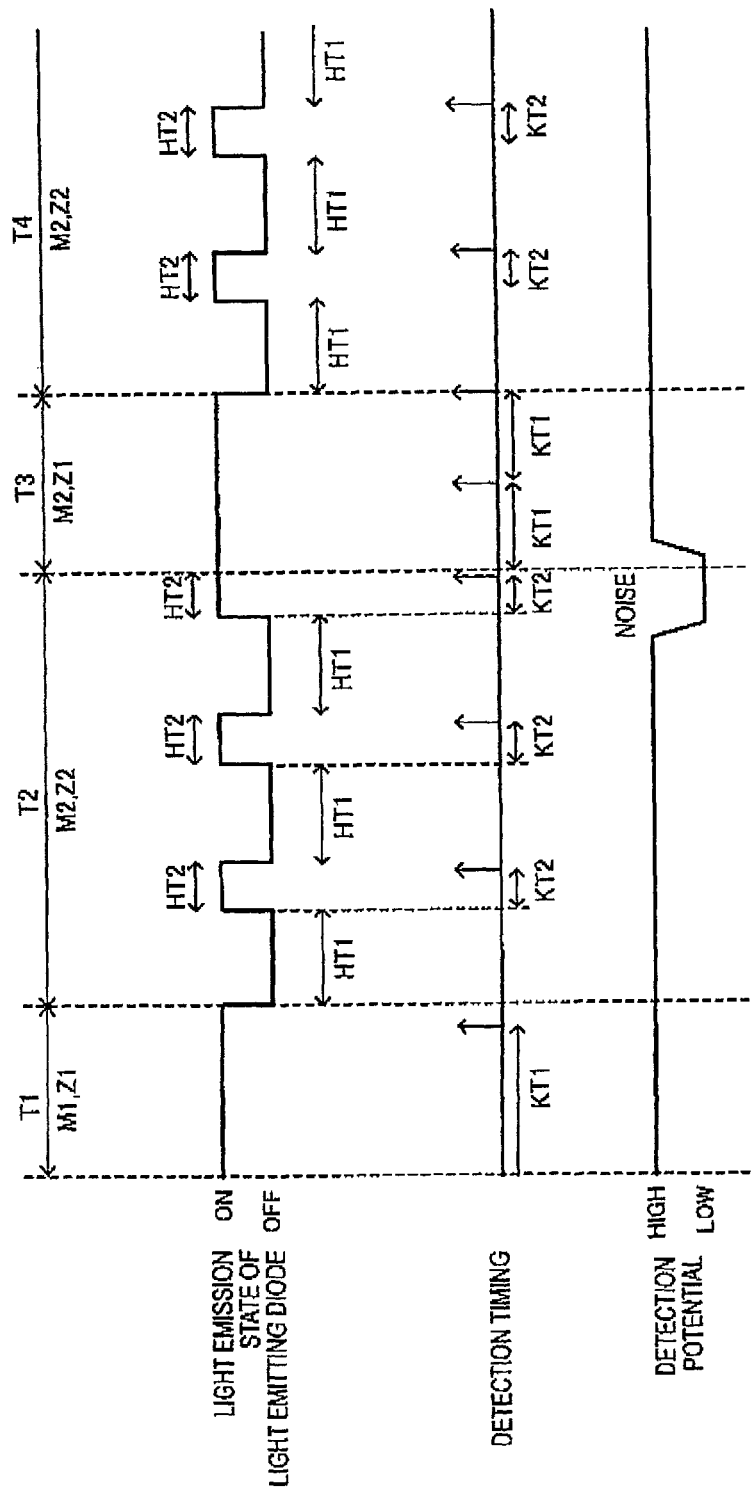
FIG. 11 is a timing chart illustrating detection timing according to the first illustrative aspect.

As illustrated in FIGS. 10 and 11, the CPU 20 executes the detection control processing and in the detection control processing, the CUP 20 detects a detection potential based on two different detection conditions. During a time period T1 illustrated in FIGS. 10 and 11, the CPU 20 controls the driving section 14 in the normal mode M1 and detects the detection potential based on a first detection condition Z1. In the first detection condition Z1, the CPU 20 controls the light emitting diode 43A of the document sensor 43 to always emit light and detects the detection potential at every first detection period KT1 from the starting of light emission from the light emitting diode 43A.

During a time period T2 illustrated in FIGS. 10 and 11, the CPU 20 controls the driving section 14 in the sleep mode M2 and detects the detection potential based on a second detection condition Z2. In the second detection condition Z2, the CPU 20 controls the light emitting diode 32A of the document sensor 43 not to emit light for a non-light emission period HT1 and to emit light for a light emission period HT2 alternately and repeatedly as illustrated in FIGS. 10 and 11. The CPU 20 detects a detection potential when a second detection period KT2 has passed after the starting of the light emission period HT2. The detection timing in the second detection period Z2 is a timing when the second detection period KT2 has passed after the starting of the light emission period HT2 or may be a timing after a certain time period from the passing of the second detection period KT2.

The second detection period KT2 is shorter than the light emission period HT2. Therefore, compared to a case in the first detection condition Z1, the detection potential is detected at an earlier stage from the starting of light emission of the light emitting diode 43A in the second detection condition Z2. During a time period T3 illustrated in FIGS. 10 and 11, the CPU 20 controls the driving section 14 in the sleep made M2 and detects a detection potential based on the first detection condition Z1. When controlling the driving section 14 in the sleep mode M2, the CPU 20 does not necessarily detect a detection potential based on the second detection condition Z2. In either case of the first detection condition Z1 and the second detection condition Z2, the CPU 20 temporally stores the obtained detection potential in the RAM 26 in the order that the CPU 20 obtains the detection potential.

(Process Steps)

Process steps executed by the CPU 20 according to certain programs will be explained with reference to the flowcharts in FIGS. 7 to 9. If a power source of the multifunctional apparatus 1 is turned on by a user, the CPU 20 controls the driving section 14 in the normal mode M1 and sets the first detection condition Z1 as a condition for detecting a detection potential (step S2, during a time period T1 in FIGS. 10 and 11). The CPU 20 controls the light emitting diode 43A of the document sensor 43 to always emit light and counts passing time T from the starting of light emission from the light emitting diode 43A.

The CPU 20 waits until the passing time T reaches the first detection period KT1 (S4: NO), and if the passing time T reaches the first detection period KT1 (S4: YES), the CPU 20 detects the detection potential (S6).

Next, the CPU 20 waits until the passing time T reaches the first detection period KT1 again (S8: NO), and if the passing time T reaches the first detection period KT1 again (S8: YES), the CPU 20 detects the detection potential (S10).

Next, the CPU 20 obtains a detection result indicating whether a document is placed on the document tray 42 based on the detected detection potentials. The CPU 20 executes the determination processing, and in the determination processing, the CPU 20 determines whether an obtained detection result is normal. In this illustrative aspect, a normal detection result means that a document is placed on the document tray 42. Namely, the CPU 20 determines whether the driving section 14 is in a state in which a predetermined function such as an image forming function is executable or not by detecting whether a document is placed on the document tray 42. The CPU 20 reads from the RAM 26 the detection potential KD1 obtained in step S10 and the detection potential KD2 that is obtained immediately before step S10. If determining that the detection potential KD1 and the detection potential KD2 are LOW (S12: YES), the CPU 20 determines that a document is placed on the document tray 42. In such a case, the CPU 20 displays on the display section 12 that a document is on the document tray 42 (S20) and sets an ADF reading process flag stored in the RAM 26 to be on (S22) and returns to step S8. The CPU 20 sets the ADF reading process flag to be on and preferentially executes reading of the document by the ADF 40 even if a document is placed on the first platen glass 52. This makes the document placed on the document tray 42 to be preferentially read.

If determining that the detection potential KD1 and the detection potential KD2 are HIGH (S14: YES), the CPU 20 determines that no document is placed on the document tray 42. In such a case, the CPU 20 displays on the display section 12 that no document is on the document tray 42 (S24) and sets the ADF reading process flag to be off (S26). The CPU 20 sets the ADF reading process flag to be off and preferentially executes reading of the document that is placed on the first platen glass 52. Accordingly, if no document is placed on the document tray 42, the ADF 40 does not read the document on the document tray 42.

If determining that the detection potential KD1 is different from the detection potential KD2 (S12: NO, S14: NO), the CPU 20 does not determine whether a document is placed on the document tray 42 and does not change a state of the display section displaying whether a document is on the document tray and does not change the ADF reading process flag.

If determining that the detection potential KD1 is different from the detection potential KD2 (S12: NO, S14: NO) or after executing the process of step S26, the CPU 20 determines whether to switch the operation mode of the driving section 14 to the sleep mode M2 (S16). In step S16, the CPU 20 determines (1) whether a user inputs an instruction for switching the operation mode to the sleep mode M2 via the operation section 11 and (2) whether predetermined reference time has passed after the ADF reading process flag is set to be off.

If the determinations of (1) and (2) are negative (S16: NO), the CPU 20 returns to step S8. If one of the determinations of (1) and (2) is affirmative (S16: YES), the CPU 20 switches the operation mode of the driving section 14 to the sleep mode M2 (S32, a time period T2 in FIGS. 10 and 11). In the sleep mode M2, the CPU 20 stops power supply to the image forming section 13 and stops display on the display section 12.

The CPU 20 changes the condition for detecting a detection potential to the second detection condition Z2 (S32). The CPU 20 starts to count the passing time T after the condition for detecting a detection potential is set to be the second detection condition Z2 and controls the light emitting diode 43A of the document sensor 43 not to emit light (S34).

If the light emitting diode 43A is not emitting light (S36: NO), the CPU 20 waits until the passing time T reaches the non-light emission period HT1 (S44:NO). If determining that the passing time T reaches the non-light emission period HT1 (S44: YES), the CPU 20 controls the light emitting diode 43A to emit light (S46) and returns to step S36.

On the other hand, if determining that the light emitting diode 43A is emitting light (S36: YES), the CPU 20 waits until the passing time T reaches the second detection period KT2 (S38: NO). If the passing time T reaches the second detection period KT2 (S38: YES), the CPU 20 detects the detection potential (S40).

Next, the CPU 20 determines whether the obtained detection potential is a reference result (S42). In this illustrative aspect, the reference result means that the detection potential is LOW and that a document is placed on the document tray 42. The CPU 20 reads the detection potential KD3 that is obtained in step S40 and stored in the RAM 26. If the detection potential KD3 is HIGH (S42: NO), the CPU 20 determines that no document is placed on the document tray 42. In such a case, the CPU 20 waits until the passing time T reaches the light emission period HT2 (S48: NO), and if determining that the passing time T reaches the light emission period HT2 (S48: YES), the CPU 20 controls the light emitting diode 43A of the document sensor 43 not to emit light (S50) and returns to step S36.

On the other hand, if determining that the detection potential KD2 is LOW (S42: YES), the CPU 20 keeps controlling the driving section 14 in the sleep mode M2 and changes the condition for detecting a detection potential to the first detection condition Z1, as illustrated in FIG. 9 (S52: a time period T3 in FIGS. 10 and 11). The CPU 20 controls the light emitting diode 43A of the document sensor 43 to always emit light and starts to count the passing time T from the starting of light emission from the light emitting diode 43A.

The CPU 20 waits until the passing time T reaches the first detection period KT1 (S54:NO), and if the passing time T reaches the first detection period KT1 (S54:YES), the CPU 20 detects the detection potential (S56).

Next, the CPU 20 executes the determination processing and determines whether the obtained detection result is normal or not (S58, S60). The CPU 20 reads from the RAM 26 the detection potential KD4 that is obtained in step S58 and the detection potential KD5 that has been obtained immediately before step S58. If the detection potential KD4 and the detection potential KD5 are LOW (S58:YES), the CPU 20 determines that a document is placed on the document tray 42. In such a case, the CPU 20 keeps the condition for detecting the detection potential to be the first detection condition Z1 and changes the operation mode of the driving section 14 to the normal mode M1 (S64: a time period 75 in FIG. 10). The CPU 20 displays on the display section 12 that a document is on the document tray 42 (S66) and sets the ADF reading process flag that is stored in the RAM 26 to be on (S68) and returns to step S8.

If the detection potential KD4 and the detection potential KD5 are HIGH (S60: YES), the CPU 20 determines that no document is placed on the document tray 42. In such a case, the CPU 20 keeps maintaining the driving section 14 in the sleep mode M2 and changes the condition for detecting a detection potential to the second detection condition Z2 (S62: a time period T4 in FIG. 11). The CPU 20 starts to count the passing time T after the condition for detecting a detection potential is set to the second detection condition Z2 and returns to step S36.

If the detection potential KD4 is different from the detection potential KD5 (S58: NO, S60: NO), the CPU 20 does not determine whether a document is placed on the document tray 42 or not and returns to step S54.

4. Advantageous Effects of First Illustrative Aspect (1) In the multifunctional apparatus 1 of the first illustrative aspect, the CPU 20 controls the driving section 14 in the sleep mode M2 and detects a detection potential based on the second detection condition Z2, and in such a case, if determining that the detected detection result is normal, the CPU 20 keeps controlling the driving section 14 in the sleep mode M2 and changes the condition for detecting the detection potential from the second detection condition Z2 to the first detection condition Z1.

As illustrated in FIGS. 3 and 4, the document sensor 43 detects that no document is placed on the document tray 42 if the blocking member 44 does not positioned in the recess 43C of the document sensor 43. However, if quaking may be caused in the multifunctional apparatus 1, the blocking member 44 may be rotated around the shaft 44A and go into the recess 43C of the document sensor 43. In such a case, although no document is placed on the document tray 42, the CPU 20 may detect that a document is placed on the document tray 42. Further, noise may be caused in the wiring that connects the power source Vcc and the photoexcited transistor 43B of the document sensor 43. In such a case, although no document is placed on the document tray 42 (the detection result is not normal), the CPU 20 may erroneously detect that a document is placed on the document tray 42 (the detection result is normal). When a document is placed on the document tray 42 or a document is removed from the document fray 42, the blocking member 44 may cause chattering. This may cause repetition of on and off of the photoexcited transistor 43B. In such a case, although no document is placed on the document tray 42 (the detection result is not normal), the CPU 20 may erroneously detect that a document is placed on the document tray 42 (the detection result is normal).

If the CPU 20 determines that the obtained detection result is normal and changes the operation mode of the driving section 14 from the sleep mode M2 to the normal mode M1 upon the determination, the operation mode may be changed from the sleep mode M2 to the normal mode M1 based on the erroneous detection. This may hardly keep the driving section 14 in the sleep mode M2 according to an environment in which the multifunctional apparatus 1 is located and power saving of the multifunctional apparatus 1 may be less likely to be achieved.

In the multifunctional apparatus 1 of the first illustrative aspect, if determining that the obtained detection result is normal, the CPU 20 keeps the driving section 14 in the sleep mode M2 and keeps detecting the detection potential. Accordingly, compared to a case in that the operation mode of the driving section 14 is promptly changed from the sleep mode M2 to the normal mode M1, power saving of the multifunctional apparatus 1 is achieved.

In the multifunctional apparatus 1, when the CPU 20 keeps the driving section 14 in the sleep mode M2 and keeps detecting the detection potential, the CPU 20 changes the condition for detecting the detection potential from the second detection condition Z2 to the first detection condition Z1 to detect the detection potential. Accordingly, after starting of light emission from the light emitting diode 43A of the document sensor 43, the multifunctional apparatus 1 does not have any influence of noise or chattering for a period that is longer than the second detection period KT2 and shorter than the first detection period KT1. Erroneous detection of the document sensor 43 is less likely to occur. Especially in the second detection condition Z2, the detection potential is detected at earlier stage from the starting of light emission from the light emitting diode 43A compared to the first detection condition Z1. Light may not be stably emitted from the light emitting diode 43A. The condition for detecting the detection potential is changed from the second detection condition Z2 to the first detection condition Z1 and this stabilizes the light emission from the light emitting diode 43A and erroneous detection of the document sensor 43 is less likely to occur.

(2) After changing the condition for detecting the detection potential from the second detection condition Z2 to the first detection condition Z1, the CPU 20 detects a detection potential again. If the CPU 20 detects the detection result that is detected again is normal, the multifunctional apparatus 1 is likely to be in a normal state (in which a document is placed on the document tray 42). In the multifunctional apparatus 1 of the first illustrative aspect, in the above case, the operation mode of the driving section 14 is changed from the sleep mode M2 to the normal mode M1 to execute operations such as reading the document placed on the document tray 42.

(3) After changing the condition for detecting the detection potential from the second detection condition Z2 to the first detection condition Z1, the CPU 20 detects the detection potential again. If the CPU 20 determines the detection result that is detected again is not normal, the detection potential that is obtained before changing the condition to the first detection condition Z1 is likely to be an error. In the multifunctional apparatus 1 of the first illustrative aspect, in the above case, the CPU 20 keeps the operation mode of the driving section 14 in the sleep mode M2 and this achieves power saving of the multifunctional apparatus 1. In the multifunctional apparatus 1, the condition for detecting the detection potential is changed from the second detection condition Z2 to the first detection condition Z1, and this shortens the period of light emission from the light emitting diode 43A and suppresses power consumption due to light emission from the light emitting diode 43A. This achieves power saving of the multifunctional apparatus 1.

(4) In the multifunctional apparatus 1 of the first illustrative aspect, the CPU 20 compares the detection result with a predetermined reference result (the detection potential KD is LOW) to determine whether the detection result detected in the second detection condition Z2 is normal or not. Therefore, it is determined whether or not the state of the device that is specified by the detection result is different from the state of the device that is specified by the reference result (in which a document is placed on the document tray 42).

<Second Illustrative Aspect>

Figure 12:
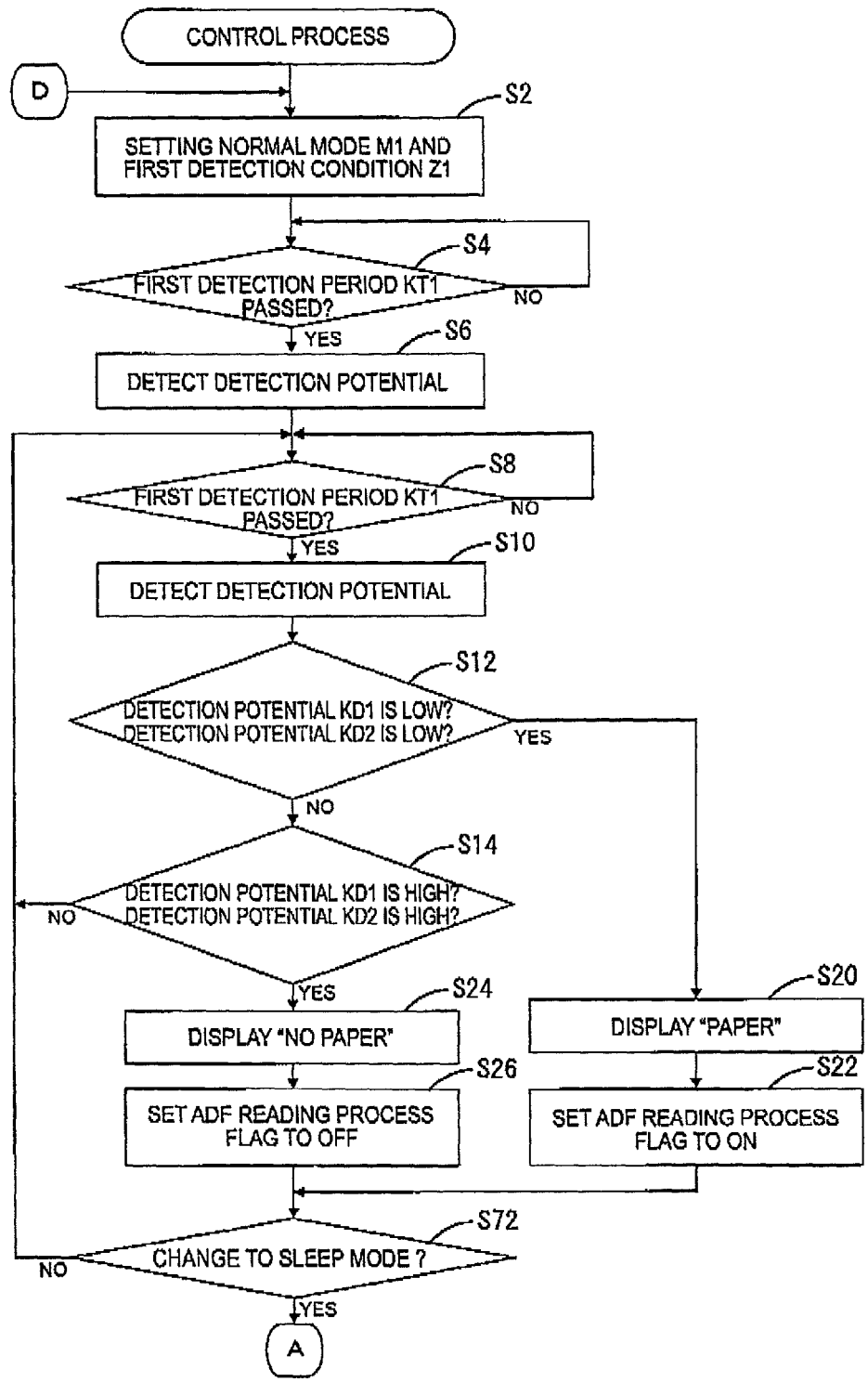
FIG. 12 is a flowchart illustrating a control process according to a second illustrative aspect.
Figure 13:
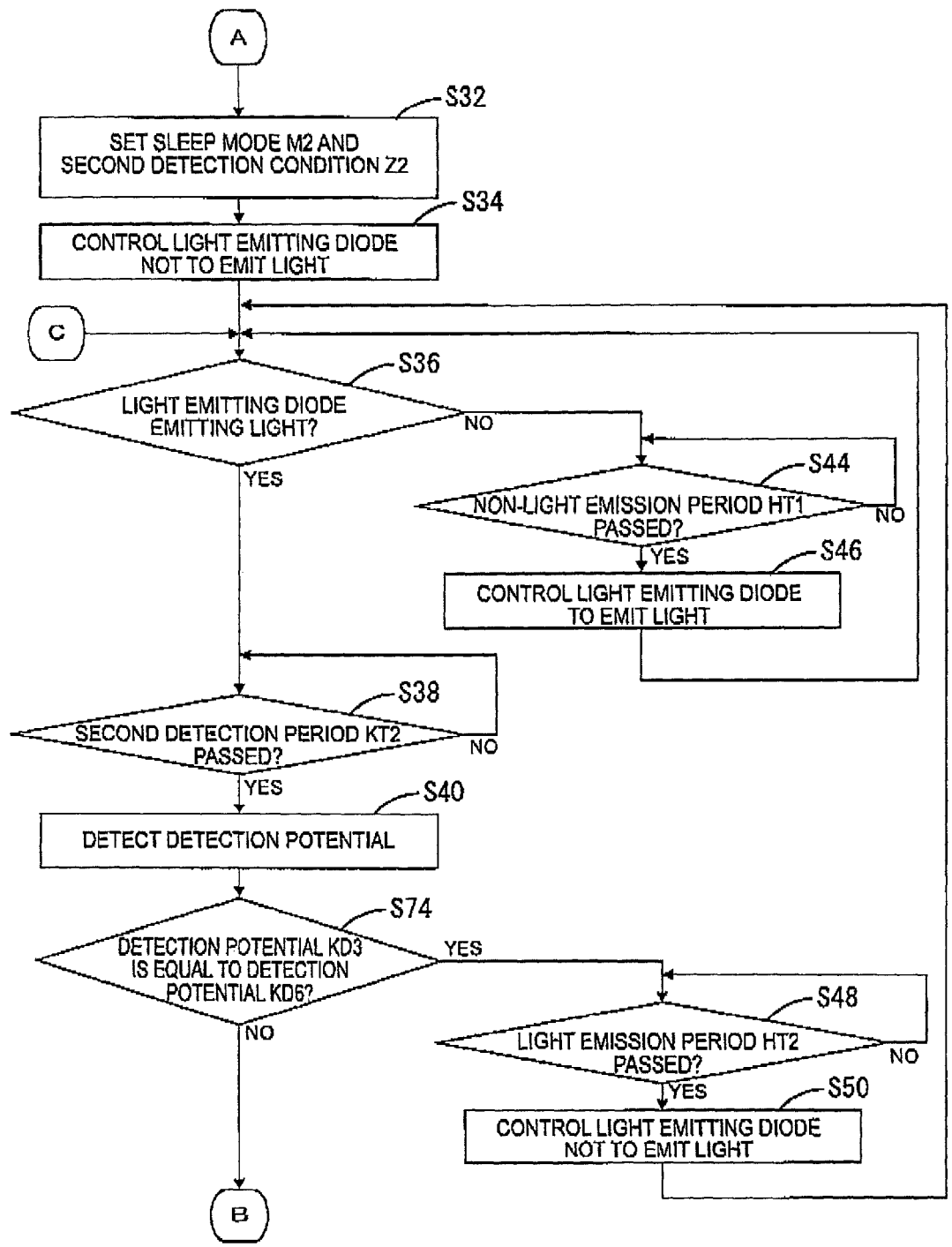
FIG. 13 is a flowchart illustrating a control process according to the second illustrative aspect.

A second illustrative aspect will be explained with reference to FIGS. 12 and 13. In the first illustrative aspect, the process is executed based on a determination result whether a document is placed on the document tray 42. However, in the multifunctional apparatus 1, it may not be important whether a document is placed on the document tray 42 or not but it may be important if a current state of the document tray 42 (a state in which a document is placed on the document tray 42 or a state in which a document is not placed on the document tray 42) is maintained. In the second illustrative aspect, the processes are executed based on determination whether the current state of the document tray 42 is maintained or not. In the following, the description same as the first illustrative aspect will be omitted.

1. Control Process

A control process that is executed by the CPU 20 according to a predetermined program will be explained with reference to the flowcharts illustrated in FIGS. 12 and 13. If a power source of the multifunctional apparatus 1 is turned on by a user, the CPU 20 executes processes from step S2 to step S10 as illustrated in FIG. 12. If the detection potentials KD1, KD2 obtained in the processes are LOW (S12:YES), the processes of steps S20 and S22 will be executed. If the obtained detection potentials KD1, KD2 are HIGH (S14:YES), the processes of steps S24 and S26 will be executed.

In the above cases, the detection results obtained by the CPU 20 do not change between the one obtained for the first time and the one obtained at the second time. The state of the document on the document tray 42 is maintained for the detection period from the first detection to the second detection. In such a case, the CPU 20 determines whether to change the operation mode of the driving section 14 to the sleep mode M2 (S72). The CPU 20 makes such determination by determining (1) if a switching instruction for changing the operation mode to the sleep mode M2 is input by a user via the operation section 11 and (2) if the state of the document on the document tray 42 is maintained for a period longer than a predetermined reference period.

If the determination of (1) and (2) is negative (S72:NO), the process returns to step S8. If one of the determination of (1) and (2) is affirmative (S72:YES), the CPU 20 changes the operation mode of the driving section 14 to the sleep mode M2 and changes the detection condition for detecting a detection potential to the second detection condition Z2 (S32). as illustrated in FIG. 13.

If the determination of step S12 and step S14 is negative, that is, if the state of the document on the document tray 42 is not maintained for the detection period from the first detection to the second detection, the process returns to step S8.

After changing the operation mode to the sleep mode M2, the CPU 20 executes the processes from step S32 to step S40 and executes the determination processing. In the determination processing, the CPU 20 determines whether the detection result obtained based on the detected potentials in the processes from step S32 to step S40 is normal (S74). In the second illustrative aspect, the normal detection result means that the state of the document on the document tray 42 is maintained or is not changed. The CPU 20 reads from the RAM 26 the detection potential KD3 that is obtained in step S40 and the detection potential KD6 that is obtained immediately before step S40. If determining that the detection potential KD3 is equal to the detection potential KD6 (S74:YES), the CPU 20 determines that the state of the document on the document tray 42 is maintained. In such a case, the CPU 20 executes the processes of steps S48 and S50 and returns to step S36.

If determining that the detection potential KD3 is different from the detection potential KD6 (S74:NO), the CPU 20 determines that the state of the document on the document tray 42 is not maintained. In such a case, the process proceeds to step S52 in FIG. 9 and the CPU 20 controls the driving section 14 in the sleep mode M2 and changes the detection condition for detecting a detection potential to the first detection condition Z1 and executes the processes from step S52 to step S68.

4. Advantageous Effects of Second Illustrative Aspect (1) In the multifunctional apparatus 1 of the second illustrative aspect, one obtained detection potential is compared to another detection potential that is obtained immediately before the one obtained detection potential to determine whether the one obtained detection result is normal. Therefore, it is determined whether the detection potential is maintained for a detection period from the first detection to the second detection, and it is determined whether the document placed on the document tray or the state of the document tray is maintained for the detection period. Namely, the CPU 20 determines whether the driving section 14 is in a state in which a predetermined function such as an image forming function is executable or not by detecting whether the document placed on the document tray or the document tray is maintained for the detection period.

<Third Illustrative Aspect>

A third illustrative aspect will be explained with reference to FIGS. 14 to 16. In the third illustrative aspect, when detecting a detection potential based on the second detection condition Z2, a detection potential is detected at least twice during a same light emission period and the detected detection potentials are compared to each other. In the following, configurations and explanation similar to the first illustrative aspect will be omitted.

1. Control Process (Process Operation)

In the light emission period HT2 in the second detection condition Z2, the CPU 20 detects a detection potential for every second detection period KT2 from the starting of the light emission period HT2. In the third illustrative aspect, the light emission period HT2 is twice as long as the second detection period KT2 or more and a detection potential can be detected at least twice in the second detection condition.

The processes executed by the CPU 20 according to a predetermined program will be explained with reference to flowcharts illustrated in FIGS. 7, 9 and 14. If a power source of the multifunctional apparatus 1 is turned on by a user, the CPU 20 executes processes of steps S2 to S26 and changes the operation mode to the sleep mode M2 in a certain case as illustrated in FIG. 8.

Figure 14:
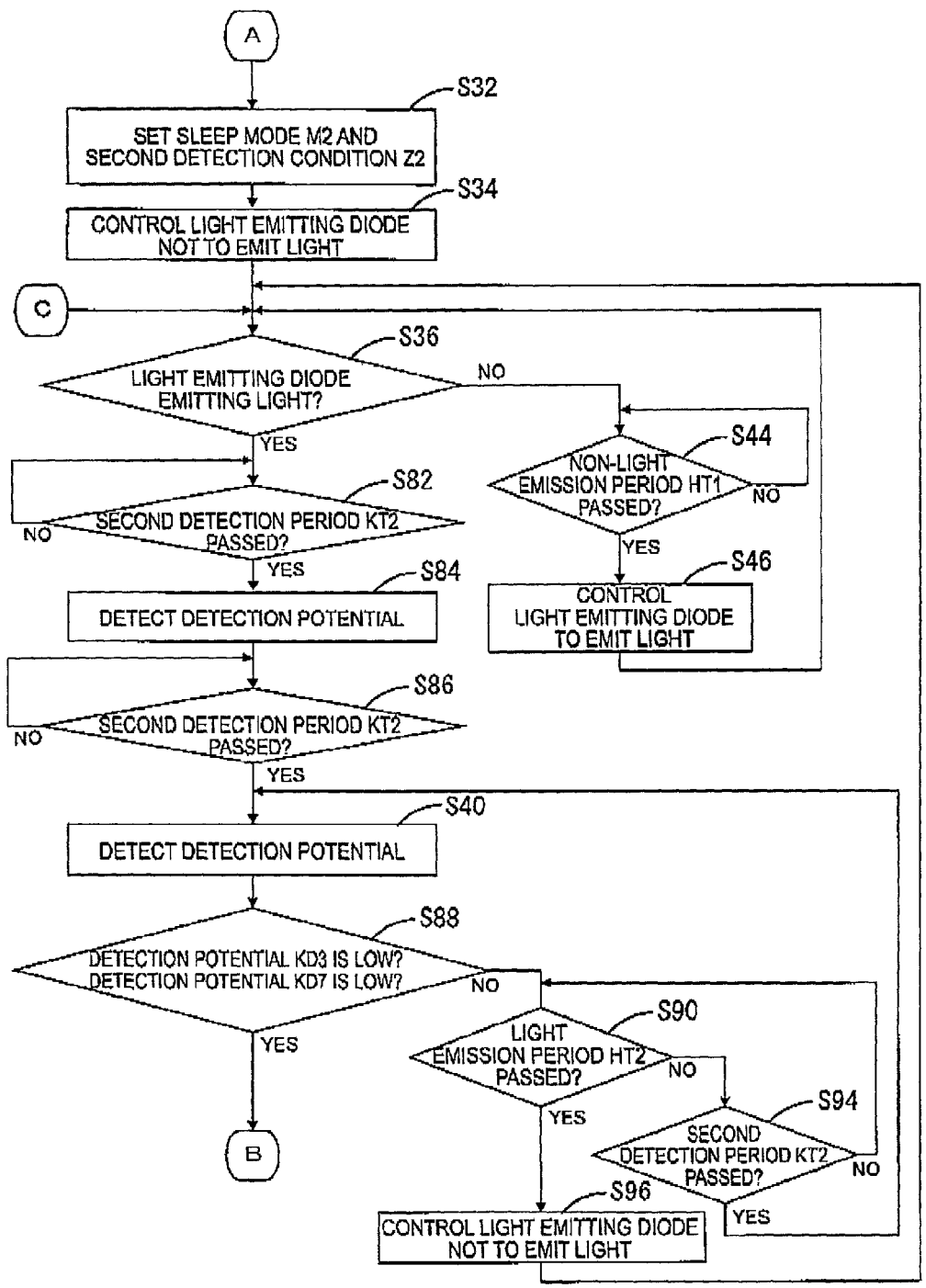
FIG. 14 is a flowchart illustrating a control process according to a third illustrative aspect.

As illustrated in FIG. 14, after changing the operation mode to the sleep mode M2, the CPU 20 executes the processes of steps S 32 and S34. If determining that the light emitting diode 43A is not emitting light (S36:NO), the CPU 20 executes processes of steps S44 to S46 and returns to step S36.

If determining that the light emitting diode 43A is emitting light (S36:YES), the CPU 20 waits until the passing time T reaches the second detection period KT2 (S82:NO). IP the passing time T reaches the second detection period KT2 (S32:YES), the CPU 20 detects a detection potential (S84).

Next, the CPU 20 waits until the passing time T reaches another second detection period KT2 (S86:NO) and if the passing time T reaches another second detection period KT2 (S86:YES), the CPU 20 detects a detection potential (S40).

The CPU 20 reads from the RAM 26 the detection potential KD3 that is detected in step S40 and the detection potential KD7 that is detected immediately before step S40 and detected during the same light emission period HT2 in which the detection potential KD3 is detected. If determining that the detection potential KD3 and the detection potential KD7 are LOW (S88:YES), the process proceeds to step S52 in FIG. 9. The CPU 20 controls the driving section 14 in the sleep mode M2 and changes the detection condition for detecting a detection potential to the first detection condition Z1 and executes the processes from step S52 to step S68.

If determining that at least one of the detection potential KD3 and the detection potential KD7 is HIGH (S88:NO), the CPU 20 determines if the passing time T reaches the light emission period HT2 (S90). If determining that the passing time T reaches the light emission period HT2 (S90:YES), the CPU 20 controls the light emitting diode 43A not to emit light (S96) and returns to step S36.

If determining that the passing time T does not reach the light emission period HT2 (S90:NO), the CPU 20 determines whether the passing time T reaches the second detection period KT2 (S94). If the CPU 20 determines that the passing time T reaches the second detection period KT2 (S94:YES), the process returns to step S40. If the CPU 20 determines that the passing time T does not reach the second detection period KT2 (S94:NO), the CPU 20 returns to step S90.

2. Advantageous Effect of Third Illustrative Aspect (1) In the multifunctional apparatus 1 of the third illustrative aspect, the detection potentials that are detected during the same light emission period HT2 are compared to each other to determine whether the detection result is normal or not. Accordingly, it can be determined if a document is placed on the document tray 42 during the light emission period HT2.

Figure 15:
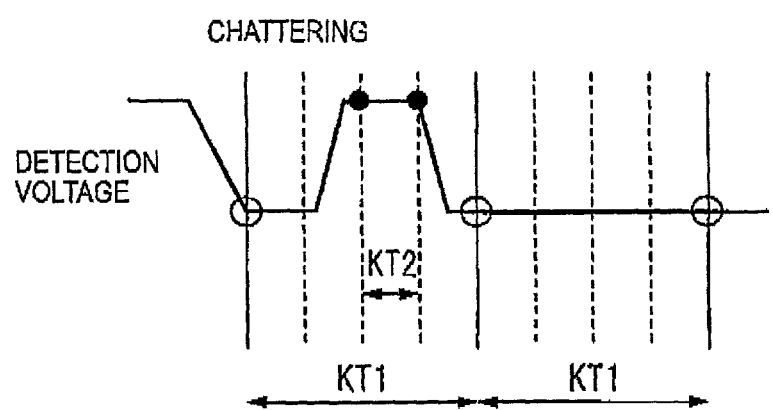
FIG. 15 is a view illustrating a time interval of a detection timing.
Figure 16:
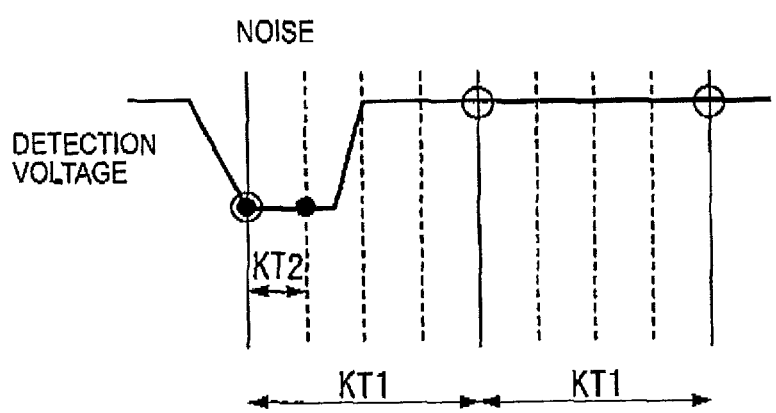
FIG. 16 is a view illustrating a time interval of a detection timing.

(2) As illustrated in FIGS. 15 and 16, a time interval between detection timings of detecting a plurality of detection potentials during a same light emission period HT2 is preferably set short to obtain same environmental condition such as temperature. The time interval between detection timings during the same light emission period HT2 is set to be short, and therefore the second detection period KT2 can be set to be sort. This suppresses power consumption due to light emission from the light emitting diode 32A and achieves power saving in the multifunctional apparatus 1.

On the other hand, the short time interval between detection timings is likely to cause chattering (FIG. 15) and noises (FIG. 16) at a plurality of detection timings. If noise or quaking may be caused in the apparatus over a time period from the detection timing of the detection potential KD3 to the detection timing of the detection potential KD7, the detection potentials KD3, KD7 are detected erroneously (black circles in FIGS. 15 and 16) and the CPU 20 may make erroneous determinations.

In the multifunctional apparatus 1 of the third illustrative aspect, detection potentials that are obtained during the same light emission period HT2 are compared to each other to obtain a detection result and if it is determined that the obtained detection result is not normal, the detection condition for detecting a detection potential is changed to the first detection condition Z1 and a detection potential is obtained. Accordingly, detection potentials are obtained during the first detection period KT1 that is longer than a time interval between the detection timings in the light emission period HT2. This suppresses occurrence of erroneous detection by the document sensor 43 and erroneous determination by the CPU 20 (white circles in FIGS. 15 and 16).

<Other Illustrative Aspects>

The scope of the present invention is not limited to the illustrative aspects described above with reference to the drawings. The following illustrative aspects may be included in the technical scope of the present invention.

(1) In the above illustrative aspects, the multifunctional apparatus 1 is explained. However, the technology may be applied to an apparatus having at least one of functions of a scanner, a copier and a facsimile apparatus.

Any apparatuses that include a photosensor and a processing unit executing predetermined function can be used as long as the apparatus controls the processing unit selectively in one of two or more operation modes that require different consumption power based on a detection result of the photosensor. The apparatus does not necessarily execute image forming processing. For example, the technology may be applied to a sheet count apparatus including a tray on which sheets such as bills are placed on and a photosensor that detects presence of the sheet on the tray. In such an apparatus, if a detection result of the photosensor indicates that there is a sheet on the tray, the counting processing for counting the number of sheets on the tray becomes executable. For example, the technology may be applied to a processing apparatus including a cover that can be open and closed and a photosensor that detects opening and closing of the cover. In such an apparatus, if a detection result of the photosensor indicates that the cover is closed, predetermined function such as an image forming function becomes executable.

(2) In the above illustrative aspects, the multifunctional apparatus 1 includes one CPU and the CPU 12 executes the detection control processing, the determining processing and the mode control processing. However, each processing may be executed by an exclusive circuit such as a CPU or an ASIC (Application Specific Integrated Circuit).

(3) In the above illustrative aspects, the detection condition for detecting a detection potential and the operation mode of the driving section 14 are controlled based on the detection potential detected by the document sensor 43 that is arranged on the document tray 42. A sensor for obtaining detection potentials is not necessarily the document sensor 42. For example, a sensor for detecting an open state and a closed state of the document placing portion 50 or a sensor for detecting if any document is on the transfer path 45 may be used. A photosensor may have other configurations as long as it detects change of the state of the apparatus.

(4) In the above illustrative aspects, if a document is placed on the document tray 42, a detection potential detected by the document sensor 43 is LOW, and if no document is placed on the document tray 42, a detection potential detected by the document sensor 43 is HIGH. However, setting of a detection potential detected by the document sensor 43 when determining whether a document is placed on the document tray 42 and a specification of the document sensor 43 are not limited thereto. For example, the detection potential detected by the document sensor 43 may be HIGH when a document is placed on the document tray 42 and in such a case, the photoexcited transistor 43B that is turned of when light from the light emitting diode 43A enters the photoexcited transistor 43B may be used.

(5) In the above illustrative aspects, a detection potential obtained in the normal mode M1 is compared to a detection potential obtained at a previous detection timing so as to detect whether a document is placed on the document tray 42. The detection potential may be compared to the detection potential that is obtained prior to the previous detection timing.

To detect whether a document is placed on the document tray 42, a reference state may be previously set based on a state in which a document is placed on the document tray 42 and the detection potential may be compared to the reference state. The detection timing, the number of detection times and the detection condition in the illustrative aspects are examples and are not limited thereto.

(6) In the above illustrative aspects, the program that executes control processing is stored in the ROM 24. However, the program may be stored in any non-volatile memory such as a hard disk, a flash memory (registered trademark), CD-ROM.

(7) The control process may be executed at detection timing as illustrated in FIG. 17. If determining that a detection potential KIM is low (S42: YES), the CPU 20 keeps controlling the driving section 14 in the sleep mode M2 and change the condition for detecting a detection potential to a third detection condition Z3 as illustrated in FIG. 17 (a time period T3 in FIG. 17). The CPU controls the light emitting diode 43A of the document sensor 43 to always emit light and starts to count the passing time T from the starting of light emission from the light emitting diode 43A.

The CPU 20 waits until the passing time T reaches a third detection period KT3, and if the passing time T reaches the third detection period KT3, the CPU 20 detects a detection potential. The third detection period KT3 is shorter than the first detection period KT1 and longer than the second detection period KT2. In this modification, the second detection condition Z2 is an example of the second determination and the third detection condition Z3 is an example of the first determination, and the first detection condition Z1 is an example of the third determination.

Each function of the apparatus is achieved by hardware resources with which the function is specified by a configuration, hardware resources with which the function is specified by a program, or combination thereof. Each function is not necessarily achieved with a hardware resource that is physically independent from other hardware resources.

What is claimed is:

1. A processing apparatus comprising:
   a photosensor including a light emitting element and a light receiving element, the light emitting element emitting light and the light receiving element receiving light emitted from the light emitting element and outputting a light receiving signal according to an amount of the received light;
   a processor; and
   a memory storing computer readable instructions, when executed by the processor, cause the processing apparatus to:
   control the light emitting element to emit light for a first light emission period,
   detect the light receiving signal output from the light receiving element at every interval during the first light emission period and obtain a first detection result in response to the detected light receiving signal, the interval being shorter than the first light emission period;

make first determination by determining, based on the first detection result, whether the processing apparatus is in a condition in which the predetermined function is executable;

control the light emitting element to emit light for a second light emission period that is shorter than the first light emission period;

detect the light receiving signal output from the light receiving element after a waiting period passing from starting of the second light emission period and obtain a second detection result in response to the detected light receiving signal, the waiting period being shorter than the second light emission period and shorter than the interval;

make second determination by determining, based on the second detection result, whether the processing apparatus is in a condition in which the predetermined function is executable;

execute one of a first mode and a second mode that requires smaller consumption power than the first mode, and change an operation mode of the processing apparatus between the first mode and the second mode;

make the second determination during execution of the second mode;

in response to determination in the second determination in the second mode that the processing apparatus is in the condition in which the predetermined function is executable, keep the second mode and make the first determination; and in response to determination in the first determination in the second mode that processing apparatus is in the condition in which the predetermined function is executable, keep detecting the light receiving signal output from the light receiving element at the interval during the first light emission period and obtaining the first detection result in response to the detected light receiving signal, and change the operation mode from the second mode to the first mode.

2. The processing apparatus according to claim 1, wherein according to the determination in the first determination in the second mode that the processing apparatus is in the condition in which the predetermined function is inexecutable, keep the second mode and control the light emitting element to emit light for the second light emission period and detect the light receiving signal output from the light receiving element after the waiting period passes from starting of the second light emission period and makes the second determination.

3. The processing apparatus according to claim 1, wherein the predetermined function is an image data processing function.

4. The processing apparatus according to claim 1, further comprising a sheet tray configured to have a sheet thereon, wherein the amount of light that the light receiving element receives is determined by whether the sheet tray has a sheet or not.

5. The processing apparatus according to claim 1, wherein:
the second detection result is compared with a reference result;
according to the determination that the second detection result corresponds to the reference result, determine that the processing apparatus is in the condition in which the predetermined function is executable;
and according to the determination that the second detection result has no correspondence to the reference result, determine that the processing unit is in the condition in which the predetermined function is inexecutable.

6. The processing apparatus according to claim 1, wherein a light receiving signal corresponds to a potential and the first detection result, the second detection result and the reference result represent a potential.

7. The processing apparatus according to claim 1, wherein the memory is configured to store the first detection result and the second detection result with information relating to an order in which each of the first detection result and the second detection result is stored therein, wherein:
one of the first detection result and the second detection result is compared to an immediate prior detection result that is detected immediately prior to the one of the detection result and the second detection result,
according to determination that the one of the first detection result and the second detection result is equal to the immediate prior detection result, determine that the processing unit is in the condition in which the predetermined function is executable, and
according to determination that the one of the first detection result and the second detection result is different from the immediate prior detection result, determine that the processing unit is in the condition in which the predetermined function is inexecutable.

8. The processing apparatus according to claim 1, further comprising a sheet tray having a document that is to be transferred into the processing apparatus, wherein the photosensor detects if the document is placed on the sheet tray.

9. A processing apparatus comprising:
a photosensor including a light emitting element and a light receiving element, the light emitting element emitting light and the light receiving element receiving light emitted from the light emitting element and outputting a light receiving signal according to an amount of the received light;
a processor; and
a memory storing computer readable instructions, when executed by the processor, cause the processing apparatus to:
control the light emitting element to emit light for a first light emission period;
detect the light receiving signal output from the light receiving element at every interval during the first light emission period and obtain a first detection result in response to the detected light receiving signal, the interval being shorter than the first light emission period;
make first determination by determining, based on the first detection result, whether the processing apparatus is in a condition in which the predetermined function is executable;
control the light emitting element to emit light for a second light emission period that is shorter than the first light emission period;
detect the light receiving signal output from the light receiving element at every second interval during the second light emission period and obtain a second detection result in response to the detected light receiving signal, the second interval being shorter than the second light emission period and shorter than the interval; and make second determination by determining, based on the second detection result, whether the processing apparatus is in a condition in which the predetermined function is executable, wherein the memory is configured to store the first detection result and the second detection result with order information relating to an order in which each of the first detection result and the second detection result is stored therein, and the configured computer readable instructions, when executed by the processor, further cause the processing apparatus to:

execute one of a first mode and a second mode that requires smaller consumption power than the first mode, and change an operation mode of the processing apparatus between the first mode and the second mode;

make the second determination at least twice during executing the second mode;

compare at least two second detection results that have sequence order information; and make third determination, based on comparison of the two second detection results, whether the two second detection results are equal to each other, wherein:

in response to determination that the two second detection results are equal to each other, determine that the processing apparatus is in the condition in which the predetermined function is executable, in response to determination that the two second detection results are different from each other, determine that the processing apparatus is in the condition in which the predetermined function is inexecutable and keep the second mode and make the first determination; and in response to determination in the first determination in the second mode that processing apparatus is in the condition in which the predetermined function is executable, keep detecting the light receiving signal output from the light receiving element at the interval during the first light emission period and obtaining the first detection result in response to the detected light receiving signal, and change the operation mode from the second mode to the first mode.

10. The processing apparatus according to claim 9, wherein the second light emission period is twice as long as the second detection period or more.

11. The processing apparatus according to claim 9, wherein the at least two detection results that are detected in the same second light emission period and have sequence order information are compared.

12. The processing apparatus according to claim 10, wherein the computer readable instructions, when executed by the processor, further cause the processing apparatus to:

control the light emitting element to emit light for a third light emission period that is longer than the second light emission period;

detect the light receiving signal output from the light receiving element at every third detection interval that is longer than the interval and obtain a third detection result;

make third determination by determining, based on the third detection result, whether the processing apparatus is in a condition in which the predetermined function is executable; and according to the first determination in the second mode that the processing apparatus is in a condition in which the predetermined function is executable, change the operation mode from the second mode to the first mode and make the third determination.

13. A non-transitory computer readable device storing data processing instructions to be executed by a processing apparatus, the processing apparatus including a photosensor including a light emitting element and a light receiving element, the light emitting element emitting light and the light receiving element receiving light emitted from the light emitting element and outputting a light receiving signal according to an amount of the received light, the data processing instructions comprising at least a data processing program, when executed by the processing apparatus, causes the processing apparatus to function as:

a first light emission control module configured to emit light from the light emitting element for a first light emission period;

a first detection module configured to detect the light receiving signal output from the light receiving element at every interval during the first light emission period and obtain a first detection result according to the detected light receiving signal, the interval being shorter than the first light emission period;

a first determination module configured to determine whether the processing apparatus is in a condition in which the predetermined function is executable based on the first detection result;

a second light emission control module configured to emit light for a second light emission period that is shorter than the first light emission period;

a second detection module configured to detect the light receiving signal output from the light receiving element after a waiting period passes from starting of the second light emission period and obtain a second detection result according to the detected light receiving signal, the waiting period being shorter than the second light emission period and shorter than the interval;

a second determination module configured to determine whether the processing apparatus is in a condition in which the predetermined function is executable based on the second detection result; and a mode control module configured to execute the processing apparatus in one of a first mode and a second mode that requires smaller consumption power than the first mode, and change an operation mode of the processing apparatus between the first mode and the second mode, wherein:

the second determination module makes determination in the second mode and according to determination by the second determination module that the processing unit is in the condition in which the predetermined function is executable, the mode control module keeps the second mode and the first determination module makes determination.

14. The non-transitory computer readable device according to claim 13, wherein according to determination by the first determination module in the second mode that processing apparatus is in the condition in which the predetermined function is executable, the mode control module changes the operation mode from the second mode to the first mode.

* * * * *